US012706941B2

(12) United States Patent
Alsaloom

(10) Patent No.: US 12,706,941 B2
(45) Date of Patent: Aug. 11, 2026

(54) ASSESSING VIABILITY OF NEW APPLICATIONS DURING NETWORK CONFIGURATION

(71) Applicant: Citibank, N.A., New York, NY (US)

(72) Inventor: Mohamed Alsaloom, London (GB)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/007,427

(22) Filed: Dec. 31, 2024

(65) Prior Publication Data

US 2026/0189591 A1 Jul. 2, 2026

(51) Int. Cl.

| | |
|---|---|
| ***H04L 41/08*** | (2022.01) |
| ***H04L 9/40*** | (2022.01) |
| ***H04L 41/0866*** | (2022.01) |
| ***H04L 41/0894*** | (2022.01) |
| ***H04L 41/14*** | (2022.01) |
| ***H04L 41/16*** | (2022.01) |

(52) U.S. Cl.

CPC .......... *H04L 63/1433* (2013.01); *H04L 41/08* (2013.01); *H04L 41/0866* (2013.01); *H04L 41/0894* (2022.05); *H04L 41/145* (2013.01); *H04L 41/16* (2013.01)

(58) Field of Classification Search

CPC . H04L 41/08; H04L 41/0806; H04L 63/1433; H04L 41/0866; H04L 41/0894; H04L 41/145; H04L 41/16; H04L 41/0803

See application file for complete search history.

(56) References Cited

U.S. PATENT DOCUMENTS 10,862,749 B1 * 12/2020 Kiyak ..................... H04L 45/50
11,552,974 B1 * 1/2023 Bagga ..................... H04L 65/61
11,968,088 B1 * 4/2024 Yan ..................... H04L 41/0823
12,069,082 B2 * 8/2024 Shao ..................... G06F 40/216
2016/0099883 A1 * 4/2016 Voit ..................... H04L 45/22 709/226
2021/0089375 A1 3/2021 Ghafourifar et al.
2022/0166679 A1 * 5/2022 Hafeez .................. H04L 41/145
2024/0073087 A1 2/2024 Henkel et al.

(Continued)

FOREIGN PATENT DOCUMENTS

WO WO-2025012894 A1 * 1/2025 ........... H04L 41/145

OTHER PUBLICATIONS

Jacobs, Arthur S. et al., Hey, Lumi! Using Natural Language for Intent-Based Network Management, Jul. 14-16, 2021, USENIX Annual Technical Conference, 978-1-939133-23-6, pp. 1-16. (Year: 2021).*

(Continued)

*Primary Examiner* — Gregory Todd

(74) *Attorney, Agent, or Firm* — Ashurst Perkins Coie US LLP

(57) ABSTRACT

Systems and methods are described herein for novel uses and/or improvements for autonomous configuration of network applications on a network. When a request is received for adding a new application to the network, the system may analyze the request and identify which network devices need a change in configuration. The system may also determine, based on the request, what type of changes are needed. The system may then generate one or more commands for each identified network device and transmit those commands to each device for performing automatic network configuration for the application.

18 Claims, 8 Drawing Sheets

400

| Device ID (403) | Links (406) | Device_Type (409) | Configuration Source (412) |
|---|---|---|---|
| Router_Int | Server Zone A<br>Firewall_Int<br>Link_A;LinkB | Router | <Address> |
| Firewall_Int | Router_Int<br>Firewall_ext | Firewall_T1 | <Address> |
| Firewall_Ext | Firewall_Int<br>Target | Firewall_T2 | <Address> |
| Firewall_DMZ_A | Zone A<br>Firewall_ext | Firewall_T1 | <Address> |
| Firewall_DMZ_B | Firewall_Int<br>DMZ | Firewall_T2 | <Address> |

(56) References Cited

U.S. PATENT DOCUMENTS

| | | | | |
|---|---|---|---|---|
| 2024/0380653 | A1 | 11/2024 | Brocato | |
| 2024/0430310 | A1* | 12/2024 | Finster | H04L 63/10 |
| 2025/0106237 | A1* | 3/2025 | Ghosh | H04L 63/1433 |
| 2025/0175479 | A1* | 5/2025 | Callaghan | H04L 41/0816 |
| 2025/0202765 | A1* | 6/2025 | Upadhyay | H04L 41/0813 |
| 2026/0095372 | A1* | 4/2026 | Singh | H04L 41/08 |

OTHER PUBLICATIONS

A. Leivadeas and M. Falkner, "A Survey on Intent-Based Networking," in IEEE Communications Surveys & Tutorials, vol. 25, No. 1, pp. 625-655, First quarter 2023, doi: 10.1109/COMST.2022.3215919. (Year: 2023).*

U.S. Appl. No. 19/007,405, filed Dec. 31,2024, Mohamed Alsaloom, Autonomous Network Configuration for New Applications.

Office Action Final issued Jun. 17, 2025, in U.S. Appl. No. 19/007,405.

* cited by examiner

200

```
{
"source": ["source_zone_identification"],
"destination": ["destination_zone_identification"],
"protocol": "tcp", "sourcePorts": ["any"],
"destPorts": [ "443"],
"csiId": "166789",
"sector": "Sector_ID",
"region": "region_ID", "subEnvironment": "Env_ID", "jra": "CLOUD-1234",
"url": ""
}
```

| Device ID (303) | Virtual Link (306) | Device_Type (309) | Configuration Source (312) |
| --- | --- | --- | --- |
| Router_Int | Source_Server<br>Firewall_Int | Router | <Address> |
| Firewall_Int | Router_Int<br>Firewall_ext | Firewall_T1 | <Address> |
| Firewall_Ext | Firewall_Int<br>Target | Firewall_T2 | <Address> |

| Device ID (403) | Links (406) | Device_Type (409) | Configuration Source (412) |
|---|---|---|---|
| Router_Int | Server Zone A<br>Firewall_Int<br>Link_A;LinkB | Router | <Address> |
| Firewall_Int | Router_Int<br>Firewall_ext | Firewall_T1 | <Address> |
| Firewall_Ext | Firewall_Int<br>Target | Firewall_T2 | <Address> |
| Firewall_DMZ_A | Zone A<br>Firewall_ext | Firewall_T1 | <Address> |
| Firewall_DMZ_B | Firewall_Int<br>DMZ | Firewall_T2 | <Address> |

ASSESSING VIABILITY OF NEW APPLICATIONS DURING NETWORK CONFIGURATION

BACKGROUND

Computer networks are made up of different hardware and software that are able to communicate with each other through common frameworks and standards like the Open System Interconnection (OSI). Network security enforcement points (firewall, Access Lists, Security Group, etc.) are deployed at various places across the communication path to protect systems and data. While there have been multiple attempts to standardize how network policy is applied holistically, the industry has yet to converge into any single framework, and each vendor/service provider follows different policy definitions and configuration methods. These different approaches allow for inconsistency in applying policies across different enforcement points and ultimately negatively impact security and compliance. Furthermore, modern application development techniques aim to increase agility, flexibility, and application resiliency, hence requiring a high degree of automation and abstraction to enforce a secure environment. Developers are not expected to understand the underlying infrastructure but rather focus on their application logic.

This may be especially important in cloud computing environments, where network security has become ever more important. Cloud computing systems may include many computing devices that have various combinations of memory, processors, disk space, communication devices, etc. Those computing devices are in need of protection against all types of threats from outside and inside of the cloud network. In many cases, network devices are susceptible to additional risk when network configuration changes are performed on those devices (e.g., when new applications are added to the environment, requiring configuration updates on those network devices). Those risks may be somewhat mitigated by thoroughly testing any changes being performed prior to application setup. At the same time, it is important that the cloud environment be easy to use and new applications are easy to deploy so that customers utilize the cloud computing environment without undue burdens.

SUMMARY

Accordingly, a framework is described herein for autonomously performing network configuration changes on network devices during application configuration, e.g., during application onboarding. In addition, systems and methods are described herein for autonomously determining a risk factor or set of risk factors associated with a proposed configuration change and, based on the risk factor or set of risk factors being too high, stopping the configuration.

Attempting to create the above-identified framework (e.g., to perform network configuration changes on network devices during application configuration) in view of the available conventional approaches created significant technological uncertainty. Creating such a framework required addressing several unknowns in conventional approaches, such as bringing together disparate standards and system designs onto a single framework, thereby enabling autonomous global configuration of newly deployed applications. Similarly, conventional approaches in network configuration when onboarding new applications rely on multiple vendors who provide their own proprietary solutions that work mainly with their own hardware. Thus, these proprietary solutions are unable to determine a full set of network devices that need network configuration updates and which network updates need to be performed for each device.

In more specific terms, conventional approaches rely on manual device updates or, at best, multiple network device update systems (e.g., provided by multiple vendors) to devices that operators select based on analyzing application requirements. For example, a conventional system may enable an operator to input commands into one device at a time or into a proprietary application that only works with one make of device, thereby failing to determine a full extent of network devices that need configuration updates. As discussed above, conventional approaches typically involve an operator analyzing network requirements for each application to be deployed onto the network and determining which network devices need to be updated. Once that determination is made, an operator may update each device separately, which is an inefficient and time-consuming process. Conversely, the disclosed system solves this problem by autonomously determining which devices need updates and generating commands to be sent to each device to perform the updates. Additionally, there was no way for developers to instruct network devices for bringing applications online, which created further technological uncertainty since the legacy approach required many moving parts and, thus, was time consuming and inefficient.

To overcome the technological uncertainties, multiple design alternatives were systematically evaluated. For example, attempts were made to integrate different vendor solutions. It was desired to give developers the flexibility to tell the system what they needed for a given application, which allowed for an understanding of the full scope of the framework that was needed.

In some examples, when a new application is ready for deployment, a network configuration system may be used for autonomously assigning and/or updating one or more network configurations of network devices associated with the new application. The network configurations may be security configurations such as access lists, protocols (that may be enabled or disabled), ports (that may be open or closed), etc. In some embodiments, the network configuration system may use natural language processing to process an input that includes a requested network configuration change. The result of natural language processing may include metadata indicating the network configuration updates that are needed and sources (e.g., application programming interfaces (APIs)) that enable the network configuration updates. Furthermore, the network configuration system may determine a network path for the configuration. The network path may include one or more network devices that need configuration changes to deploy or otherwise use the application. Once the enabling sources and the required network devices are known, the network configuration system may generate configuration change commands for those devices and cause those commands to be executed.

In some instances, the network configuration system may receive, from a user, a natural language query input requesting to configure an application on a network. The network may be a network that has multiple nodes hosting a multitude of services. For example, the network may be a cloud computing network that includes both servers and network devices (e.g., routers, switches, and/or other suitable devices). The network configuration system may receive a natural language query from a developer. The query may ask for a particular application to be deployed through, for example, a firewall, a demilitarized zone, and/or through another suitable set of devices. The network configuration system may analyze the natural language query (e.g., using a natural language processing system) for context and content.

The network configuration system may then identify, based on processing the natural language query, what changes are needed to be made to configure the application. In particular, the network configuration system may determine, from the natural language query input, metadata for configuring the application on the network. The metadata may include permission settings and corresponding permission types. For example, the metadata may indicate that a particular port needs to be opened on a firewall for the application to receive incoming traffic.

In some embodiments, the network configuration system may work without a natural language query. Instead of the natural language query, the network configuration system may receive a file (e.g., a configuration file) that outlines various configurations needed for the application being deployed. The configuration file may include port numbers, addresses, and other suitable information. In some instances, the configuration file may include metadata for the network configuration. Accordingly, the network configuration system may take, as input, the configuration file and/or natural language query input.

The network configuration system may identify, using the metadata, a corresponding plurality of configuration sources published for the plurality of network devices. Each configuration source of the plurality of configuration sources may provide a mechanism for performing a corresponding command associated with the application configuration. For example, each required network device may have an associated source (e.g., an API) that enables particular commands to be executed in relation to that device. In some instances, a source may be associated with a device type (e.g., multiple firewalls may be associated with a particular set of commands provided by the source, such as an API).

In addition, the network configuration system may generate a network path for configuring the application. The network path may include a plurality of network devices and network connections connecting the plurality of network devices. For example, if the application needs to be external facing (e.g., Internet facing), the network path may include one set of network devices. However, if the application is internal facing (e.g., only for the users of a particular environment), the network configuration system may determine a different path (e.g., a path that does not include externally facing firewalls).

The network configuration system may then generate, based on the configuration sources, commands for configuring the network devices within the network path. For example, the network path may indicate that firewalls within a demilitarized zone and externally facing firewalls need to have their configuration modified to deploy the application. In addition, the generated network path may indicate that a number of internal routers along the path need a modified configuration. The network configuration system may then generate those modification commands, based on the sources, for those devices. The network configuration system may then transmit the commands to corresponding network devices.

In some examples, when a new application is ready for deployment, a network configuration system may be used for autonomously assessing a risk associated with the network configuration changes. In some embodiments, the network configuration system may receive a request to update the network configuration (e.g., of a cloud environment) in connection with deploying a new application. For example, a new externally facing application may be undergoing deployment on the network. When the request is received, the network configuration system may extract from the request metadata that indicates what kind of network changes are requested. The network configuration system may then identify, based on the metadata, network devices that are to be configured and configuration settings needed for those devices. The network configuration system may then, based on this network device configuration information, determine a risk score associated with the configuration request. Based on determining that the risk score meets a threshold, the network configuration system may then identify one or more devices having a requested configuration that causes the risk score to meet the threshold and/or notify the requester that the network configuration cannot be performed. The notification may include the device identification and other information.

In particular, the network configuration system may receive a configuration request for performing a network device configuration for an application being deployed on a network. The network may include a multitude of network devices providing a multitude of network services. For example, the network may be a cloud environment that is hosting client applications and enables deployment of new client applications. That cloud environment may include servers, switches, routers, firewalls, and/or other suitable network devices. Thus, the network system may receive a request from a developer indicating that a new application is ready to be deployed to the network. The application may be an Internet-facing application and may require changes to the configuration of a firewall and/or other network devices.

The network configuration system may then determine, from the configuration request, metadata for configuring the application on the network. The metadata may include permission settings and/or corresponding permission types for configuration changes. For example, an application may need a permission to send and receive network traffic over a particular port number. That permission may need to extend to external (e.g., Internet) traffic. In addition, the application may require permissions to access one or more databases and/or other logical components of the network infrastructure. The network configuration system may determine those requirements from the metadata associated with the configuration request.

The network configuration system may then identify, using the metadata, network devices that are to be configured for the application and configuration settings for each of those network devices. For example, if the application needs changes to an external firewall to allow a specific type of traffic, the network configuration system may identify the device or devices and the associated device settings that need to be configured to effect those changes.

The network configuration system may then determine, based on the network devices that require configuration changes and the configuration commands, a risk score associated with the configuration request. In some instances, the network configuration system may enable traffic over an already existing network where network routing is not affected but network security is affected. However, in other instances, both network routing and network security may be affected. For example, the configuration system may calculate the risk score based on which network devices need to be configured and what changes need to be put onto each network device. For example, if the application requires that all ports be opened on an external firewall for a particular server, the network configuration system may assign a high-risk score to that operation because the server may be susceptible to all kinds of network attacks.

Based on determining that the risk score meets a threshold, the network configuration system may identify one or more devices having a requested configuration that causes the risk score to meet the threshold. To continue with the example above, if the application requires that all ports be opened on an external firewall for a particular server, the network configuration system may assign a high-risk score to that operation because the server may be susceptible to all kinds of network attacks. Thus, the network configuration system may store the name of the server and/or other suitable information. For example, the information may include the application name, port numbers, and/or other configurations required for the application. The network monitoring system may then generate, responsive to the configuration request, a notification that includes identifiers of the one or more devices. Those identifiers may be device names, serial numbers, etc. The notification may indicate that the configuration request has failed and then transmit the notification to a device associated with the configuration request.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates an excerpt of an input file, in accordance with one or more embodiments.

FIG. 3 illustrates an excerpt of a data structure for storing the network path, in accordance with one or more embodiments.

FIG. 4 illustrates an excerpt of a data structure that may store network device information for a plurality of network devices, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
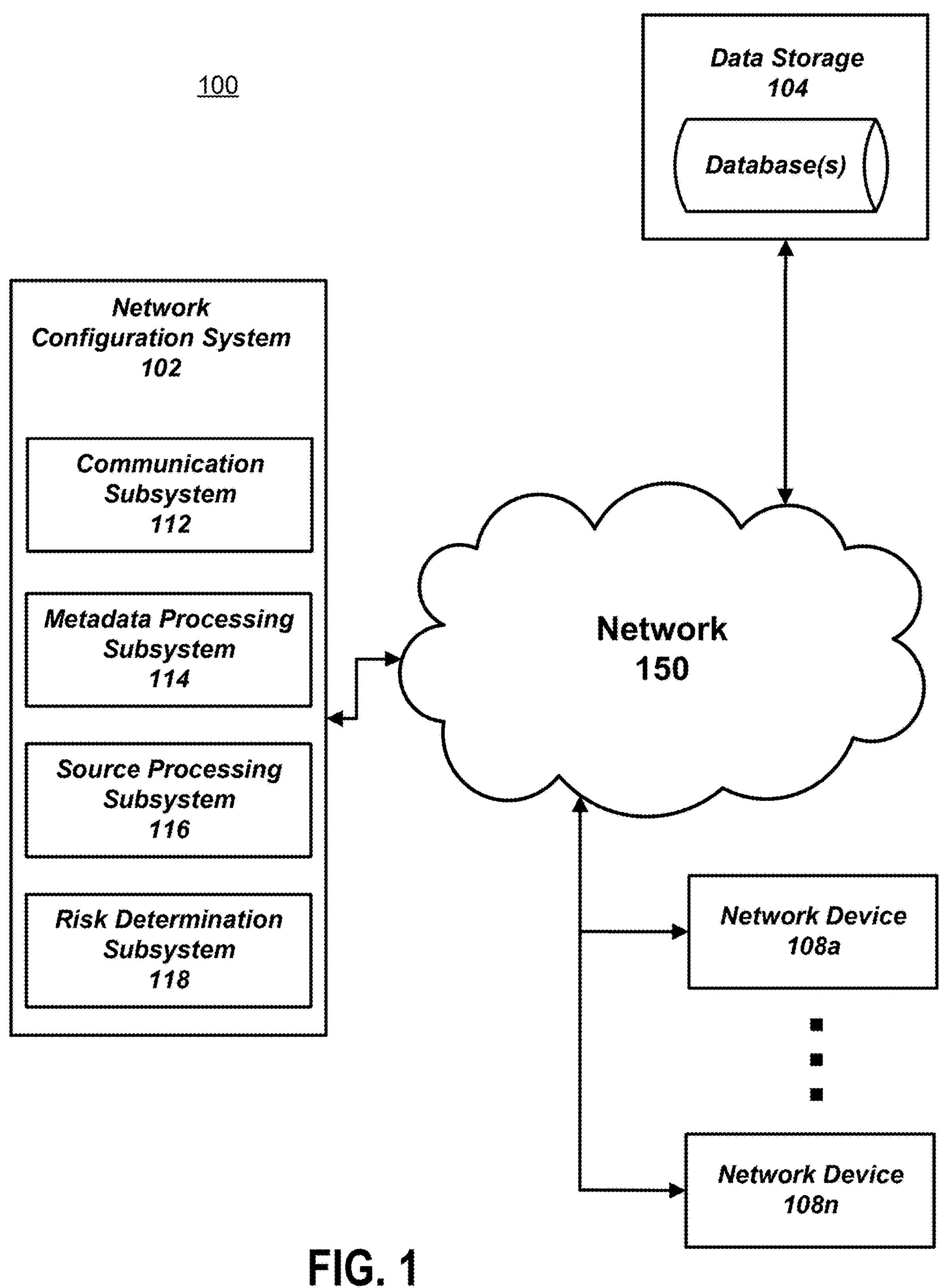
FIG. 1 shows an illustrative system for autonomously performing network configuration and risk analysis, in accordance with one or more embodiments.

FIG. 1 is an example of environment 100 for autonomously performing network configuration and risk analysis. Environment 100 may be hosted on a user computing device, on a server, or on another suitable computing device. Environment 100 includes network configuration system 102, data storage 104, and network devices **108*a*-108*n*. Network configuration system 102 may execute instructions for autonomously performing network configuration and risk analysis. Network configuration system 102 may include software, hardware, or a combination of the two. For example, network configuration system 102 may reside on a physical server or a virtual server that is running on a physical computer system. In some embodiments, network configuration system 102** may be configured on a user device (e.g., a laptop computer, a smartphone, a desktop computer, an electronic tablet, or another suitable user device).

Data storage 104 may store various data, including one or more models for processing natural language inputs, training data, network configuration data, source information, and/or other suitable data. Data storage 104 may include a combination of hardware (e.g., memory and/or disk) and software (e.g., for reading/writing data to the hardware). Network 150 may be a local area network, a wide area network, or a combination of both. Network devices **108*a*-108*n*** may be network devices such as firewalls, routers, switches, servers, and/or other suitable network devices.

Network configuration system 102 may receive, from a user (e.g., a developer), a request to configure an application on a network. The request may include an input file as well as other information for configuring the application on the network. The network may be any computer network and may include a multitude of network devices providing a plurality of network services. For example, a developer or a development team may have been developing a new application and would like to publish the application externally (e.g., to be available on the Internet) or internally (e.g., for testing by internal users). Thus, the user may send a request to the network configuration system. Network configuration system 102 may receive the request via communication subsystem 112. Communication subsystem 112 may include software components, hardware components, or a combination of both. For example, communication subsystem 112 may include software that is enabled to communicate via a network (e.g., network 150). Furthermore, communication subsystem 112 may include a network card or another suitable network communication device.

In some embodiments, the request may be in a form of an input file. The input file may include structured and/or unstructured data. FIG. 2 illustrates an excerpt from a structured input file 200. The input file may have information like the source of the application, ports required, protocols required, etc. For example, the input file may indicate that the application needs to be published to the production environment and may specify a particular cloud system where the application resides. The input file may include other information necessary for network configuration.

In some embodiments, the input file may include unstructured data. For example, the input file may include a natural language query with the information needed to configure the application on the network. The natural language query may include information needed to configure the network devices that require configuration. In some embodiments, network configuration system 102 may receive the natural query as an input without requiring an input file. That is, communication subsystem 112 may receive, from a user, a natural language query input requesting to configure an application on a network such that the network may include multiple network devices providing a multitude of network services. In some cases, the request may include a network data structure instead of an input file. The network data structure may include configuration parameters and/or a natural language query for providing network configuration for a new application. For example, the network data structure may include just a natural language query. In another example, the network data structure may include parameters (e.g., similar to the parameters shown in the input file of FIG. 2). In yet another example, the data structure may be a mix of parameters and a natural language query. When the request is received, communication subsystem 112 may pass the request or a memory pointer associated with the request to metadata processing subsystem 114.

Metadata processing subsystem 114 may include software components, hardware components, or a combination of both. For example, metadata processing subsystem 114 may use one or more processors to process data and/or store data in memory. In some embodiments, metadata processing subsystem 114 may determine, from the input file, metadata for configuring the application on the network. The metadata may include permission settings and corresponding permission types. For example, as shown in FIG. 2, permission settings may include source of where application resides and destination of where the application should be accessed, protocol, port settings, etc. However, the input file will not have any specific network devices within the file because a developer, in this instance, does not need to know anything about the network infrastructure. Thus, metadata processing subsystem 114 may extract, from the input file, parameters such as the source location, destination location, protocol information, port information, etc.

In some embodiments, instead of the input file or in addition to the input file, metadata processing subsystem 114 may use an input data structure. In particular, metadata processing subsystem 114 may receive, from a user (e.g., a developer), a request to configure an application on a network. The request may include an input data structure. As discussed above, the network may include a multitude of network devices providing multiple network services. The data structure may be a query or a string. In some embodiments, the data structure may be a file. In yet some embodiments, the input data structure may be voice input translated into text form.

Metadata processing subsystem 114 may then extract metadata for configuring the application from the input data structure. In particular, metadata processing subsystem 114 may determine, from the input data structure, metadata for configuring the application on the network. As discussed above, metadata may include permission settings and corresponding permission types. For example, the metadata may include identifiers for port numbers needed, protocols, types of devices, location of the application (e.g., where within the cloud), and/or other suitable parameters.

As discussed above, instead of or as part of the input file, metadata processing subsystem 114 may receive a natural language query input. Metadata processing subsystem 114 may then use that natural query input to identify metadata (e.g., network parameters) for configuring the application. In particular, metadata processing subsystem 114 may determine, from the natural language query input, metadata for configuring the application on the network. The metadata may include permission settings and corresponding permission types. The permission settings may include permission settings similar to those within the input file.

In some embodiments, metadata processing subsystem 114 may use a natural language processing model (e.g., a machine learning model) to determine metadata for configuring the application on the network. In particular, metadata processing subsystem 114 may determine, using a natural language processing model, one or more network security contexts for configuring the application on the network. For example, the natural language processing model may be trained to identify security contexts within the natural language input. Security contexts may be, for example, a source location (e.g., indicating where the application resides), the destination (e.g., indicating where the application is to be published), one or more protocols (e.g., transmission control protocol, user datagram protocol, etc.), source ports, destination ports, and/or other parameters (e.g., as indicated by an input file described above).

When metadata processing subsystem 114 identifies one or more security contexts, metadata processing subsystem 114 may compare the one or more network security contexts with a plurality of security metadata entries within a metadata repository. For example, metadata processing subsystem 114 may have access to a repository of security contexts that store various security contexts and corresponding metadata portions. For example, if the security context received from the natural language processing model indicates that any source port should be allowed for the application/server, metadata processing subsystem 114 may find that entry within the repository and extract the metadata.

Metadata processing subsystem 114 may then generate the metadata based on one or more security metadata entries that match the one or more network security contexts. In some embodiments, metadata processing subsystem 114 may add the different matching metadata to a data structure or a file. To continue with the example above, if metadata processing subsystem 114 matches a source port configuration indicating any source port should be allowed, metadata processing subsystem 114 may add to the "sourcePorts": ["any" ] entry to the data structure or the file. Metadata processing subsystem 114 may stitch together the different matching contexts to create the metadata.

In some embodiments, the input file itself may include a natural language query. Thus, metadata processing subsystem 114 may process the input file in a way similar to processing the natural language input without being included in the input file discussed above. In particular, metadata processing subsystem 114 may determine that the input file includes a natural language query. Metadata processing subsystem 114 may make the determination based on a flag within the file, the format of the text, and/or another suitable mechanism. For example, metadata processing subsystem 114 may determine that the text within the file does not follow any known format. Based on that determination, metadata processing subsystem 114 may determine that the file includes a natural language query.

As discussed above, metadata processing subsystem 114 may determine, using a natural language processing model, one or more network security contexts for configuring the application on the network. The natural language processing model may be a machine learning model that is able to recognize contexts of input text. Furthermore, as discussed above, metadata processing subsystem 114 may compare the one or more network security contexts with a plurality of security metadata entries within a metadata repository and generate the metadata based on one or more security metadata entries that match the one or more network security contexts. For example, metadata processing subsystem 114 may stitch together metadata portions representing different identified contexts.

Metadata processing subsystem 114 may then use the metadata to determine a network path for application configuration. That is, metadata processing subsystem 114 may determine which devices on the network should have their configuration updated so that the application is configured on the network. In particular, metadata processing subsystem 114 may generate, based on the metadata, a network path for configuring the application. The network path may include a subset of the plurality of network devices and network connections connecting the subset of the plurality of network devices. For example, the metadata, as extracted from the input file, may indicate the location of the application (e.g., a server name, a network zone, or another suitable location). In addition, the metadata, as extracted from the input file, may indicate the destination from where the application should be accessed. Metadata processing subsystem 114 may use that information to identify devices between the source location and the destination. Metadata processing subsystem 114 may then determine that the configuration on those devices needs to be updated. Thus, those devices may constitute the network path. The network path may be stored in a database or a table.

FIG. 3 illustrates an excerpt of a data structure 300 for storing a network path. The data structure may be a file, a database table, or another suitable data structure. Data structure 300 may include a device identifier field 303 that may identify the network device within the network path. The device identifier may be a device name, address, and/or another suitable device identifier. Field 306 may store a virtual link to the devices within the network path. The virtual link may include the previous device in the chain and the next device in the chain. Field 309 may include the device type. Device types may include routers, switches, firewalls, and/or other suitable device types. Field 312 may include a configuration source address, which will be discussed in another section of this document.

In some embodiments, metadata processing subsystem 114 may determine the network path based on the source location and the destination based on network configuration data stored in, for example, a database. The data may be stored as a graph where nodes represent network devices and edges represent connections. Thus, metadata processing subsystem 114 may determine a path between the source location (e.g., the source node, such as a server hosting the application) and the destination (e.g., the destination node, such as an external-facing firewall). In some embodiments, other parameters within the metadata may be used to determine the network path. For example, sectors, regions, environments, and/or other designations may be used to determine the network path.

In some embodiments, the natural language processing model may be used to identify the network path. The natural language processing model may be one that has been trained using a training dataset that includes sources, destinations, and other parameters, with the network path being the target variable to predict. In particular, metadata processing subsystem 114 may determine, using a natural language processing model, one or more network device contexts for configuring the application on the network. For example, the network device contexts, as described above, may be sectors, regions, environments, and/or other network contexts. For example, a network context may indicate that a configuration is required for an externally facing application. Other contexts may include a source zone such as a specific subnet, etc.

Metadata processing subsystem 114 may then compare the one or more network device contexts with a plurality of device metadata entries within a metadata repository. For example, every context may have corresponding device metadata stored within a repository. Thus, metadata processing subsystem 114 may compare a context of "external access" to the contexts within the repository and determine, based on the context, a device identifier (e.g., an identifier of an external firewall) for a device to add to the network path. Metadata processing subsystem 114 may also use the context to identify the source device by comparing the contexts to entries within the repository. That is, metadata processing subsystem 114 may identify, based on comparing each network device context with a plurality of network device contexts, the subset of the plurality of network devices for the application. In some embodiments, metadata processing subsystem 114 may use native path analysis tools (e.g., AWS network analyzer) to determine the plurality of network devices between the source and the destination and associated information combine the information with the metadata.

Metadata processing subsystem 114 may then generate or determine the network path based on one or more device metadata entries that match the one or more network device contexts. For example, if metadata processing subsystem 114 determines the source and the target devices, metadata processing subsystem 114 may calculate a virtual path between those devices to generate the network path. In some embodiments, metadata processing subsystem 114 may analyze connections between all network devices and determine a path from the source device to the target device. FIG. 4 illustrates an excerpt of a data structure 400 that may store network device information for a plurality of network devices. The data structure may be a file, a database table, or another suitable data structure. Data structure 400 may include a device identifier field 403 that may identify the network device within the network. The device identifier may be a device name, address, and/or another suitable device identifier. Field 406 may store virtual links to other devices within the network. In some embodiments, data structure 400 may store device data for all network devices within the network, and field 406 may store all the direct links to other devices within the network. In some embodiments, data structure 400 may store indirect links as well. Field 409 may store device types of the corresponding devices. Device types may include routers, switches, firewalls, and/or other suitable device types. Field 412 may include a configuration source address.

Metadata processing subsystem 114 may pass the network path and other information to source processing subsystem 116. Source processing subsystem 116 may include software, hardware, or a combination of both. Source processing subsystem 116 may identify, using the network path, a plurality of configuration sources published for the subset of the plurality of network devices. Each configuration source may provide a mechanism for performing a corresponding command associated with application configuration. For example, each configuration source may provide an application programming interface for executing commands against a type of the network device. For example, a configuration source may include an address (e.g., a network address) to which commands may be sent.

In some embodiments, metadata processing subsystem 114 may use a connectivity matrix (e.g., as illustrated in FIG. 4) to determine a network path. As discussed above, metadata processing subsystem 114 may compare each network device context of the one or more network device contexts with network device data associated with the plurality of network devices within the network. For example, every context may have corresponding device metadata stored within a repository. Thus, metadata processing subsystem 114 may compare a context of "external access" to the contexts within the repository and determine, based on the context, a device identifier (e.g., an identifier of an external firewall) for a device to add to the network path. Metadata processing subsystem 114 may also use the context to identify the source device by comparing the contexts to entries within the repository. That is, metadata processing subsystem 114 may identify, based on comparing each network device context with a plurality of network device contexts, the subset of the plurality of network devices for the application.

Metadata processing subsystem 114 may also use the context to identify the source device by comparing the contexts to entries within the repository. That is, metadata processing subsystem 114 may identify, based on comparing each network device context with a plurality of network device contexts, the subset of the plurality of network devices for the application. Metadata processing subsystem 114 may then determine the network path based on a connectivity matrix for the subset of the plurality of network devices. For example, metadata processing subsystem 114 may use a database or a data structure (e.g., as shown in FIG. 4) to perform a lookup of connections for each device in the subset. Based on the connections, metadata processing subsystem 114 may identify the network path.

In some embodiments, configuration sources may be unique to different types of network devices. For example, a switch may allow one set of commands. However, a firewall may allow a different set of commands. Furthermore, different types of firewalls (e.g., from different vendors) may allow different types of commands and different formats of commands. In some embodiments, source processing subsystem 116 may perform a lookup for an address associated with the configuration source of each device. That is, source processing subsystem 116 may perform a lookup (e.g., using a device identifier) for an application programming interface address for sending commands to that particular device.

In some embodiments, source processing subsystem 116 may perform the following operations when identifying configuration sources. Source processing subsystem 116 may determine, for a first network device of the subset of the plurality of network devices, a device type associated with the first network device. That is, source processing subsystem 116 may iterate through each device within the network path and determine a device type of the device. For example, source processing subsystem 116 may perform a lookup to determine a device type associated with each network device (e.g., starting with the first network device). For example, a configuration source may be stored for each device type and have a particular network address. Thus, if a command needs to be sent to a particular type of a firewall, source processing subsystem 116 may use the device identifier and a command to send to the network address associated with the device type. Thus, source processing subsystem 116 may determine, based on the device type, one or more configuration sources published for the device type. Source processing subsystem 116 may then add the one or more configuration sources to the plurality of configuration sources. That is, source processing subsystem 116 may store an indication of the one or more configuration sources for command generation and transmission.

Network configuration system 102 may then generate network commands using source processing subsystem 116. In particular, source processing subsystem 116 may generate, based on the plurality of configuration sources, a plurality of commands for configuring the subset of the plurality of network devices. For example, source processing subsystem 116 may use a command template to generate one or more commands for each device. Source processing subsystem 116 may fill in the command template with the data from the metadata. For example, source processing subsystem 116 may fill in the device name or address of the network device, what ports must be opened for incoming traffic and outgoing traffic, and/or other suitable parameters. In some embodiments, source processing subsystem 116 may access/download templates from the configuration source itself (e.g., via a network address associated with the configuration source). In another example, the command templates may be preloaded into network configuration system 102 and/or stored in data storage 104.

In some embodiments, source processing subsystem 116 may perform the following operations when generating commands for the subset of network devices. In particular, source processing subsystem 116 may select a first network device of the plurality of network devices. That is, source processing subsystem 116 may iterate through each network device within the subset, starting with the first network device. Source processing subsystem 116 may determine, based on the metadata, a requested change for the first network device. For example, the metadata may indicate that an external firewall may need to open a specific set of ports for incoming traffic and forward the traffic that comes in on those ports through a particular network device (e.g., the internal firewall).

Source processing subsystem 116 may then access a configuration source of the plurality of configuration sources associated with the subset of network devices. For example, source processing subsystem 116 may request a command template associated with the particular type of device. The request may be sent to the address associated with the source. In some embodiments, the request may be sent to another storage location (e.g., data storage 104). In another example, the query to the configuration source may include a particular command. In response, the configuration source may transmit the requirements for the command (e.g., parameters that the command requires).

Source processing subsystem 116 may then generate a command based on input data required by the configuration source. In some embodiments, generating the command may include entering the parameters into a template. In some embodiments, generating the command may include sending command parameters to the address (e.g., network address) associated with the configuration source. The command parameters may be sent in a particular format. Source processing subsystem 116 may generate one or more commands for each network device in the subset. As discussed above, the commands may be of different formats as specified based on the configuration source (e.g., a corresponding application programming interface). In some embodiments, the command may update a security access list for the first network device, so that the application may send and/or receive traffic through the first network device.

When the commands are generated, they may be transmitted to each network device for execution. In particular, source processing subsystem 116 may transmit the plurality of commands to corresponding network devices of the subset of the plurality of network devices. Once the commands are transmitted, source processing subsystem 116 may await confirmation of execution of each command. In some embodiments, the plurality of commands may be transmitted indirectly via infrastructure as code solutions.

In some embodiments, source processing subsystem 116 may determine whether each command is permissible and/or valid. In particular, source processing subsystem 116 may extract, from each command of the plurality of commands, security data associated with each command. For example, the security data may include permission types and permission lists associated with each command. For example, the security data of a particular command may indicate that all incoming ports are to be opened for a particular server. Source processing subsystem 116 may compare each corresponding security data with stored security data. For example, a database table or another data structure may store a list of impermissible commands or impermissible parameters. Thus, the stored security data may indicate an impermissible configuration. Source processing subsystem 116 may then determine, based on the security data matching the stored security data, that configuring one or more network devices of the subset of the plurality of network devices is impermissible. For example, it may be impermissible to open all incoming ports for a particular server (e.g., address) on the internal network to be accessed externally. Accordingly, source processing subsystem 116 may detect the attempt and deny that particular configuration. Thus, source processing subsystem 116 may refrain from executing all the commands for the whole subset of the network devices. In some embodiments, source processing subsystem 116 may alert the requester of the issue.

In some embodiments, network configuration system 102 may determine a risk factor associated with performing the configuration and then notify, for example, a network engineer if the risk factor is too high before performing the configuration. Network configuration system 102 may use a risk determination subsystem 118 to determine risk. Risk determination subsystem 118 may include software, hardware, or the combination of software and hardware. Thus, network configuration system 102 may receive a configuration request for performing network device configuration for an application being deployed on a network. As discussed above, the network may include multiple network devices providing a multitude of network services.

In some embodiments, the configuration request may include an input file (e.g., as described above and shown in FIG. 2) having metadata (e.g., configuration metadata) for the network configuration. For example, the configuration file may include a multitude of parameters such as one or more protocol identifiers, one or more source ports, one or more target ports, a sources identifier (e.g., where the application is located), a destination identifier, and/or other suitable parameters. In another example, the configuration request may include a data structure that may store structured data. In yet another example, the configuration request may include unstructured data such as a natural language query/request.

In some embodiments, risk determination subsystem 118 may determine, from the configuration request, the metadata for configuring the application on the network, such that the metadata may include permission settings and corresponding permission types. For example, risk determination subsystem 118 may extract, from an input file, parameters corresponding to different settings. Risk determination subsystem 118 may use syntax matching or an Extensible Markup Language (XML) type parsing to identify different parameters within the file or within a data structure to determine the metadata. In some embodiments, risk determination subsystem 118 may use a machine learning model as described below to identify parameters within the configuration request for generating/determining the metadata.

Risk determination subsystem 118 may then determine, from the configuration request, which network devices need configuration updates and also the settings themselves that need to be updated. In particular, risk determination subsystem 118 may identify, using metadata generated based on the configuration request, (1) a subset of the plurality of network devices that are to be configured for the application and (2) a plurality of configuration settings for the subset of the plurality of network devices. Risk determination subsystem 118 may use network path identification (e.g., as described above) to identify the subset of the plurality of network devices.

For example, metadata processing subsystem 114 may generate, based on the metadata, a network path for configuring the application. The network path may include a subset of the plurality of network devices and network connections connecting the subset of the plurality of network devices. For example, the metadata, as extracted from the input file, may indicate the location of the application (e.g., a server name, a network zone, or another suitable location). In addition, the metadata, as extracted from the input file, may indicate the destination from where the application should be accessed. Metadata processing subsystem 114 may use that information to identify devices between the source location and the destination. Metadata processing subsystem 114 may then determine that the configuration on those devices needs to be updated. Thus, those devices may constitute the network path. The network path may be stored in a database or a table. As discussed above, FIG. 3 illustrates an excerpt of a data structure 300 for storing a network path.

As discussed above, metadata processing subsystem 114 may determine the network path based on the source location and the destination based on network configuration data stored in, for example, a database. The data may be stored as a graph where nodes represent network devices and edges represent connections. Thus, metadata processing subsystem 114 may determine a path between the source location (e.g., the source node, such as a server hosting the application) and the destination (e.g., the destination node, such as an external-facing firewall). In some embodiments, other parameters within the metadata may be used to determine the network path. For example, sectors, regions, environments, and/or other designations may be used to determine the network path.

In some embodiments, the natural language processing model may be used to identify the network path. The natural language processing model may be one that has been trained using a training dataset that includes sources, destinations, and other parameters, with the network path being the target variable to predict. In particular, metadata processing subsystem 114 may determine, using a natural language processing model, one or more network device contexts for configuring the application on the network. For example, the network device contexts, as described above, may be sectors, regions, environments, and/or other network contexts. For example, a network context may indicate that a configuration is required for an externally facing application. Other contexts may include a source zone such as a specific subnet, etc.

Risk determination subsystem 118 may also identify needed configuration settings for each of the devices within the subset. Risk determination subsystem 118 may identify the configuration settings based on the metadata. For example, if the metadata indicates that particular destination ports are to be opened on an external firewall for incoming traffic, risk determination subsystem 118 may identify that information as a parameter within the configuration settings. In another example, if all ports are required to be opened for outgoing traffic, risk determination subsystem 118 may identify that as another parameter within the configuration settings.

Risk determination subsystem 118 may then determine a risk factor or a risk score associated with the requested configuration. In particular, risk determination subsystem 118 may determine, based on the subset of the plurality of network devices and the plurality of configuration settings, a risk score associated with the configuration request. Risk determination subsystem 118 may use various mechanisms to determine the risk score.

In some embodiments, risk determination subsystem 118 may use network security parameters and command parameters to determine the risk score. In particular, retrieve network device data associated with a first network device of the subset of the plurality of network devices. For example, risk determination subsystem 118 may query every device in the subset of the plurality of devices and receive from those devices the corresponding network data. Network data may include a device name, a device type, model information, various configuration parameters, and/or other suitable data. In some embodiments, the network data may include the location of the device within the network (e.g., whether the device is an externally facing firewall, an internal router, etc.). In another example, risk determination subsystem 118 may access a database (e.g., at data storage 104) and request network data associated with the subset of the plurality of network devices (e.g., the network devices within the path).

Risk determination subsystem 118 may then generate, based on the network device data for the first network device, a security parameter associated with the first network device. For example, the security parameter may indicate an importance level associated with the network device as determined based on the network data. For example, if the device is an externally facing firewall with particular parameters within the network data, risk determination subsystem 118 may assign a particular score indicating that the network device has a high importance level. In some embodiments, risk determination subsystem 118 may assign an importance level (e.g., high, low, medium) to each network device.

Risk determination subsystem 118 may also generate, based on a subset of the plurality of configuration settings associated with the first network device, a command parameter associated with the first network device. In some embodiments, risk determination subsystem 118 may determine based on the configuration settings for each network device one or more commands to be executed for that network device. For example, risk determination subsystem 118 may determine that an external firewall may require opening a single network port for incoming traffic to a particular server, while opening all ports from the server for outgoing traffic. This may be a fairly safe command (e.g., based on command risk level stored within data storage 104). Accordingly, risk determination subsystem 118 may assign a command parameter with a low risk for a particular command. Risk determination subsystem 118 may repeat this assignment for other commands to the particular device. Risk determination subsystem 118 may then generate command parameters for the other network devices within the subset of the plurality of network devices.

Risk determination subsystem 118 may then determine the risk score based on the security parameter and the command parameter. For example, risk determination subsystem 118 may average the security parameter score and the command parameter score to determine the risk score (e.g., if those parameters are numeric). In some embodiments, risk determination subsystem 118 may determine the risk score based on the riskiest parameter (e.g., if the parameters are numeric). In yet some embodiments, one parameter may be numeric and one non-numeric (e.g., categorical). Thus, risk determination subsystem 118 may perform a data lookup to determine the risk score associated with the parameter pair (e.g., a risk score associated with a combination of a number and a category). In some embodiments, both parameters may be categorical. Thus, risk determination subsystem 118 may perform a lookup to determine a risk score associated with the combination of categories.

In some embodiments, risk determination subsystem 118 may use a combination of a device type and a command type to determine the risk score. In particular, risk determination subsystem 118 may determine a device type associated with a first network device of the subset of the plurality of network devices. Risk determination subsystem 118 may also determine a command type associated with a first subset of the plurality of configuration settings for the first network device. For example, risk determination subsystem 118 may determine that a device type associated with a device is a firewall and a command type is a port opening command. Based on that device type being a firewall and the command type being a port opening command, risk determination subsystem 118 may perform a lookup of the risk score. That is, when both the command type and the device type are categorical variables, risk determination subsystem 118 may perform a lookup of the risk score. However, risk determination subsystem 118 may use numeric risk scores for both command type and device type. Accordingly, risk determination subsystem 118 may add the scores for command type and device type, average the scores, or perform another suitable operation on the scores to determine the risk score. Thus, risk determination subsystem 118 may determine the risk score based on the device type and the command type.

In some embodiments, risk determination subsystem 118 may also use command parameters to determine the risk score. In particular, risk determination subsystem 118 may determine command parameters associated with the first subset of the plurality of configuration settings. For example, risk determination subsystem 118 may determine that command parameters include particular ports for opening. In some embodiments, if the port opening value indicates "any," the risk may be higher than if the ports for opening include one or more specific ports. In another example, if the ports for opening include certain well-known ports, the risk may be higher. Thus, risk determination subsystem 118 may perform a lookup to determine whether a particular port or a particular parameter indicates a certain risk value. In another example, if the ports to be opened are on an internal router rather than an external firewall, that combination of the device type and port values may indicate lower or higher risk scores. Thus, risk determination subsystem 118 may determine the risk score based on the device type, the command type, and the command parameters.

In some embodiments, risk determination subsystem 118 may generate viability scores (e.g., numeric values) for each component of the risk score and then determine the risk scores based on those viability scores. In particular, risk determination subsystem 118 may determine, based on the device type, a device viability score for the first network device. For example, for a firewall, risk determination subsystem 118 may determine a first viability score, and for a router, risk determination subsystem 118 may determine a second viability score different from the first viability score. In some embodiments, risk determination subsystem 118 may take into account the location of the network device within the network. For example, an external-facing firewall (e.g., Internet facing) may have a different viability score than an internally facing firewall. Risk determination subsystem 118 may use a combination of network device data and network mapping data to determine device type and device location. For example, risk determination subsystem 118 may query the network device itself for device type and query a database (e.g., in data storage 104) for network location data. In some embodiments, risk determination subsystem 118 may query a single source for both pieces of information. Risk determination subsystem 118 may then combine the viability score for all the network devices within the subset of devices that need configuration changes.

In some embodiments, risk determination subsystem 118 may determine, based on the command type, a command viability score for the first subset of the plurality of configuration settings. For example, risk determination subsystem 118 may generate one or more commands for each network device (e.g., within a network path) that need configuration changes. Each command may have a command identifier. Risk determination subsystem 118 may perform a lookup using the command identifier for a viability score associated with that command. Risk determination subsystem 118 may then combine all viability scores for all the commands.

In some embodiments, risk determination subsystem 118 may determine, based on the command parameters, a parameter viability score for the first subset of the plurality of configuration settings. For example, risk determination subsystem 118 may identify parameters of each of the commands generated for the network devices that need configuration changes. Those parameters may include source port numbers, destination port numbers, network locations, and/or other suitable parameters. Risk determination subsystem 118 may generate a viability score for each parameter. For example, a single port may have a certain viability score, while multiple ports may have a different viability score (e.g., making the configuration riskier). In another example, the port value may be "any," indicating all ports. Thus, risk determination subsystem 118 may assign an even riskier viability score to that parameter.

Risk determination subsystem 118 may then generate the risk score based on the device viability score, the command viability score, and the parameter viability score. For example, risk determination subsystem 118 may combine all the viability scores to generate a risk score. In some embodiments, risk determination subsystem 118 may average all the viability scores to generate the risk score.

In some embodiments, risk determination subsystem 118 may use machine learning to determine a risk score. In particular, risk determination subsystem 118 may retrieve network device data associated with the subset of the plurality of network devices. For example, risk determination subsystem 118 may query each network device within the subset of network devices and retrieve network device data. Network device data may include device type (e.g., firewall, router, switch, etc.), device identifier, and device location (e.g., externally facing, internally facing, within a demilitarized zone, etc.). In some embodiments, risk determination subsystem 118 may retrieve the network device data from a database instead of the network devices themselves.

Risk determination subsystem 118 may also retrieve the plurality of configuration settings from the subset of the plurality of network devices. Risk determination subsystem 118 may retrieve the configuration settings from, for example, an input file, an input data structure, or another suitable location. In some embodiments, risk determination subsystem 118 may extrapolate configuration settings (e.g., using natural language processing as described above) from a natural language query/request received from a developer.

Risk determination subsystem 118 may then input the network device data and the plurality of configuration settings into a machine learning model to obtain the risk score. The machine learning model may be one that has been trained to predict risk scores based on received network device data and received configuration settings. For example, the machine learning model may have been trained with training data using a training algorithm. The training data may have included a multitude of features corresponding to the network data and the configuration settings. In addition, the training data may have included a target feature, which would be the risk score. Once the machine learning model has been trained, the machine learning model may be used to predict risk scores based on the combination of network data and configuration settings. An example of a machine learning model is illustrated below.

Once the risk score has been determined, risk determination subsystem 118 may continue processing based on the risk score. In particular, risk determination subsystem 118 may, based on determining that the risk score meets a threshold, identify one or more devices having a requested configuration that causes the risk score to meet the threshold. For example, if risk determination subsystem 118 determines that the risk score does not meet the threshold, the system may continue to make configuration changes (as described above in this disclosure). However, if the risk score does meet the threshold, risk determination subsystem 118 may refrain from making the configuration changes and alert an operator.

In some embodiments, risk determination subsystem 118 may generate, responsive to the configuration request, a notification that includes identifiers of the one or more devices. The notification may indicate that the configuration request has failed. For example, risk determination subsystem 118 may indicate one or more devices within the subset and that the request has failed. In some embodiments, risk determination subsystem 118 may indicate which particular device or devices have caused a failure. For example, risk determination subsystem 118 may determine a risk score for each network device (e.g., using mechanisms described above). Risk determination subsystem 118 may then determine whether each network device has met a device threshold or another suitable threshold. If one or more devices, whether taken alone or in combination, met the device threshold, risk determination subsystem 118 may determine that the whole configuration request has met the threshold.

Risk determination subsystem 118 may then transmit the notification to a device associated with the configuration request. In some embodiments, risk determination subsystem 118 may also transmit a notification to an operator indicating configuration request failure and enable the operator to override. The notification to the operator may include details about the subset of network devices (e.g., device parameters for each network device) and proposed configuration settings. Risk determination subsystem 118 may retrieve the device parameters from each network device and/or from the database. In some embodiments, the notification may be interactive such that the operator may respond to the notification and override the failure, thereby instructing risk determination subsystem 118 to continue configuration changes.

Figure 5:
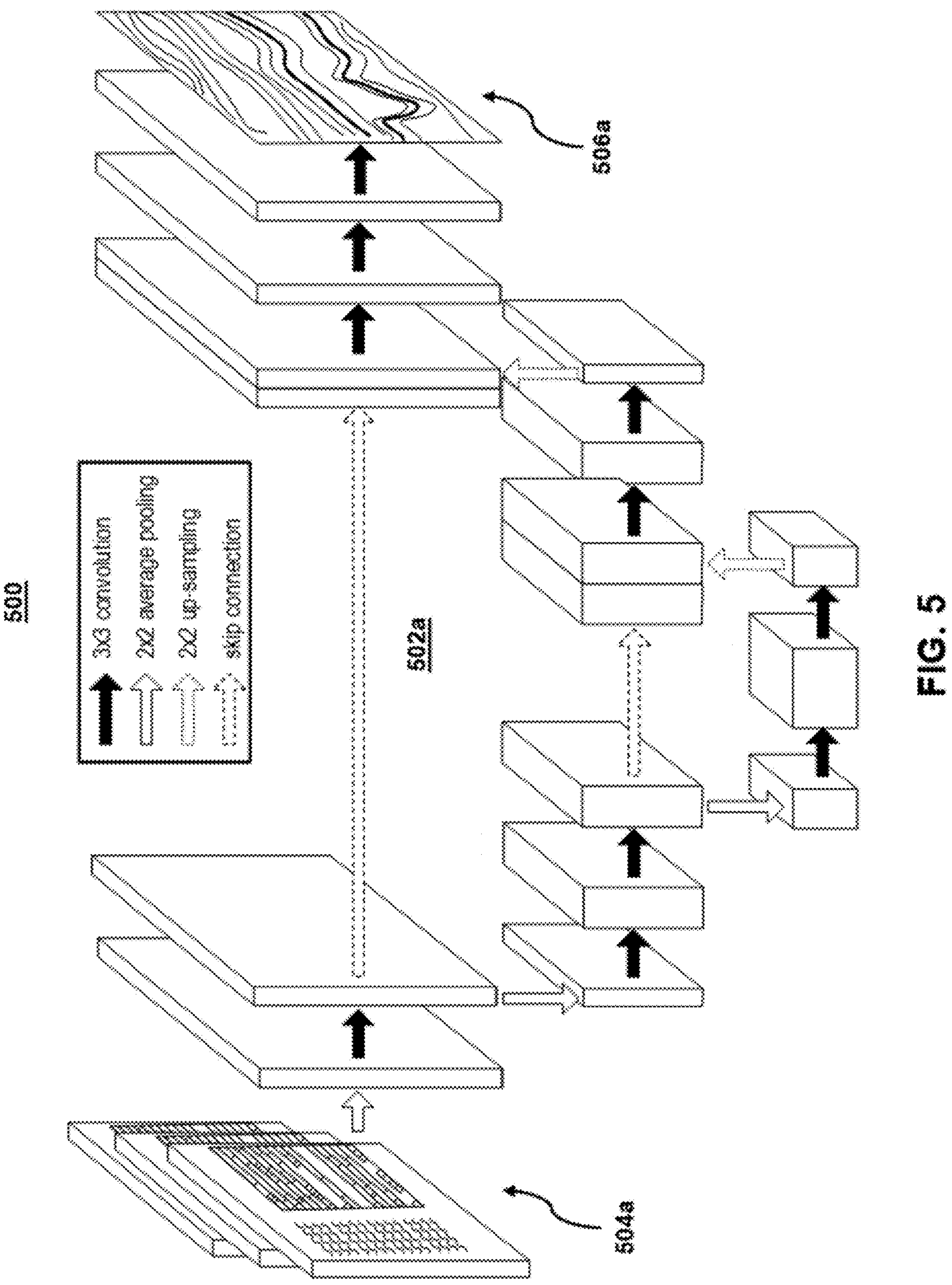
FIG. 5 shows illustrative components for a machine learning model used for natural language processing, in accordance with one or more embodiments.

FIG. 5 shows illustrative components for a machine learning model used for natural language processing and risk score determination. System 500 includes model 502*a*, which may be a machine learning model, artificial intelligence model, etc. (which may be referred to collectively as "models" herein). Model 502*a* may take inputs 504*a* and provide outputs 506*a*. The inputs may include multiple datasets, such as a training dataset and a test dataset. Each of the plurality of datasets (e.g., inputs 504*a*) may include data subsets related to user data, predicted forecasts and/or errors, and/or actual forecasts and/or errors. In some embodiments, outputs 506*a* may be fed back to model 502*a* as input to train model 502*a* (e.g., alone or in conjunction with user indications of the accuracy of outputs 506*a*, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 502*a* may update its configurations (e.g., weights, biases, or other parameters) based on the assessment of its prediction (e.g., outputs 506*a*) and reference feedback information (e.g., user indication of accuracy, reference labels, or other information). In a variety of embodiments, where model 502*a* is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 502*a* may be trained to generate better predictions.

In some embodiments, the model (e.g., model 502*a*) may automatically perform actions based on outputs 506*a*. In some embodiments, the model (e.g., model 502*a*) may not perform any actions. The output of the model (e.g., model 502*a*) may be used to generate a user token and/or a user interface token. That is, a generic model 502*a* may be trained to generate user tokens and may be referred to as a user token generation machine learning model. Another generation model 502*a* may be trained to generate user interface tokens, as described above.

Figure 6:
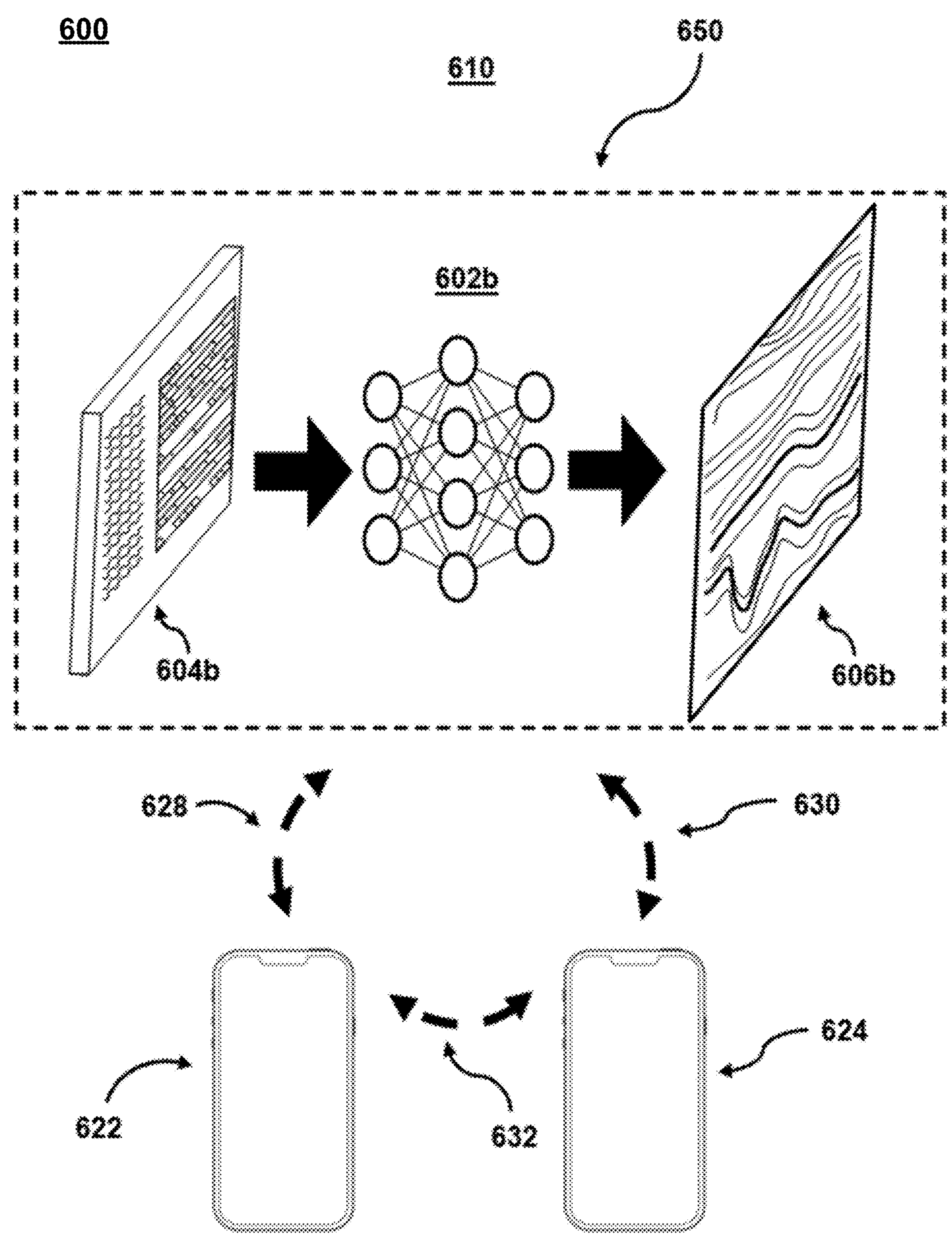
FIG. 6 shows illustrative components for a system for autonomously performing network configuration and risk analysis, in accordance with one or more embodiments.

As shown in FIG. 6, the system may include mobile device 622 and mobile device 624, which may be used to transmit configuration requests. While shown as smartphones in FIG. 6, it should be noted that mobile device 622 and mobile device 624 may be any computing device, including, but not limited to, a laptop computer, a tablet computer, a handheld computer, and other computer equipment (e.g., a server), including "smart," wireless, wearable, and/or mobile devices. System 600 may also include cloud components. For example, cloud components may be implemented as a cloud computing system and may feature one or more component devices. It should be noted that while one or more operations are described herein as being performed by particular components of system 600, these operations may, in some embodiments, be performed by other components of system 600. As an example, while one or more operations are described herein as being performed by components of mobile device 622, these operations may, in some embodiments, be performed by cloud components. In some embodiments, the various computers and systems described herein may include one or more computing devices that are programmed to perform the described functions. Additionally, or alternatively, multiple users may interact with system 600 and/or one or more components of system 600.

With respect to the components of mobile device 622 and mobile device 624, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 6, both mobile device 622 and mobile device 624 include a display upon which to display data.

Additionally, as mobile device 622 and mobile device 624 are shown as touchscreen smartphones, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 600 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 6 also includes communication paths 628, 630, and 632. Communication paths 628, 630, and 632 may include the Internet, a mobile phone network, a mobile voice or data network (e.g., a 5G or LTE network), a cable network, a public switched telephone network, or other types of communications networks or combinations of communications networks. Communication paths 628, 630, and 632 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 600 also includes API layer 650. In some embodiments, API layer 650 may be implemented on mobile device 622 or mobile device 624. Alternatively or additionally, API layer 650 may reside on one or more of cloud components 610. API layer 650 (which may be a REST or Web services API layer) may provide a decoupled interface to data and/or functionality of one or more applications. API layer 650 may provide a common, language-agnostic way of interacting with an application. Web services APIs offer a well-defined contract called WSDL that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 650 may use various architectural arrangements. For example, system 600 may be partially based on API layer 650 such that there is strong adoption of SOAP and RESTful Web services using resources like Service Repository and Developer Portal but with low governance, standardization, and separation of concerns. Alternatively, system 600 may be fully based on API layer 650, such that separation of concerns between layers like API layer 650, services, and applications is in place.

In some embodiments, the system architecture may use a microservice approach. Such systems may use two types of layers: a Front-End Layer and a Back-End Layer, where microservices reside. In this kind of architecture, the role of the API layer 650 may provide integration between the Front-End and Back-End. In such cases, API layer 650 may use RESTful APIs (exposition to Front-End or even communication between microservices). API layer 650 may use AMQP (e.g., Kafka, RabbitMQ, etc.). API layer 650 may use incipient usage of new communications protocols such as gRPC, Thrift, etc.

In some embodiments, the system architecture may use an open API approach. In such cases, API layer 650 may use commercial or open-source API Platforms and their modules. API layer 650 may use a developer portal. API layer 650 may use strong security constraints applying WAF and DDoS protection, and API layer 650 may use RESTful APIs as standard for external integration. API layer 650 may host network configuration system 102 and/or data storage 104.

As shown in FIG. 6, in some embodiments, model 602*b* may be trained by taking inputs 604*b* and providing outputs 606*b*. Model 602*b* may include an artificial neural network. In such embodiments, model 602*b* may include an input layer and one or more hidden layers. Each neural unit of model 602*b* may be connected with many other neural units of model 602*b*. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 602*b* may be self-learning and trained, rather than explicitly programmed, and can perform significantly better in certain areas of problem-solving as compared to traditional computer programs. During training, an output layer of model 602*b* may correspond to a classification of model 602*b*, and an input known to correspond to that classification may be input into an input layer of model 602*b* during training. During testing, an input without a known classification may be input into the input layer, and a determined classification may be output.

In some embodiments, model 602*b* may include multiple layers (e.g., where a signal path traverses from front layers to back layers). In some embodiments, back propagation techniques may be utilized by model 602*b* where forward stimulation is used to reset weights on the "front" neural units. In some embodiments, stimulation and inhibition for model 602*b* may be more free-flowing, with connections interacting in a more chaotic and complex fashion. During testing, an output layer of model 602*b* may indicate whether or not a given input corresponds to a classification of model 602*b*.

Model 602*b* is shown as a convolutional neural network. A convolutional neural network consists of an input layer (e.g., input 604*b*), hidden layers, and an output layer (e.g., output 606*b*). As shown in FIG. 6, the middle layers are called hidden because their inputs and outputs are masked by the activation function and final convolution. In a convolutional neural network, the hidden layers include layers that perform convolutions. Model 602*b* may comprise convolutional layers that convolve the input and pass its result to the next layer. Model 602*b* includes local and/or global pooling layers along with traditional convolutional layers. Pooling layers reduce the dimensions of data by combining the outputs of neuron clusters at one layer into a single neuron in the next layer. Also as shown, model 602*b* may comprise fully connected layers that connect every neuron in one layer to every neuron in another layer.

Figure 7:
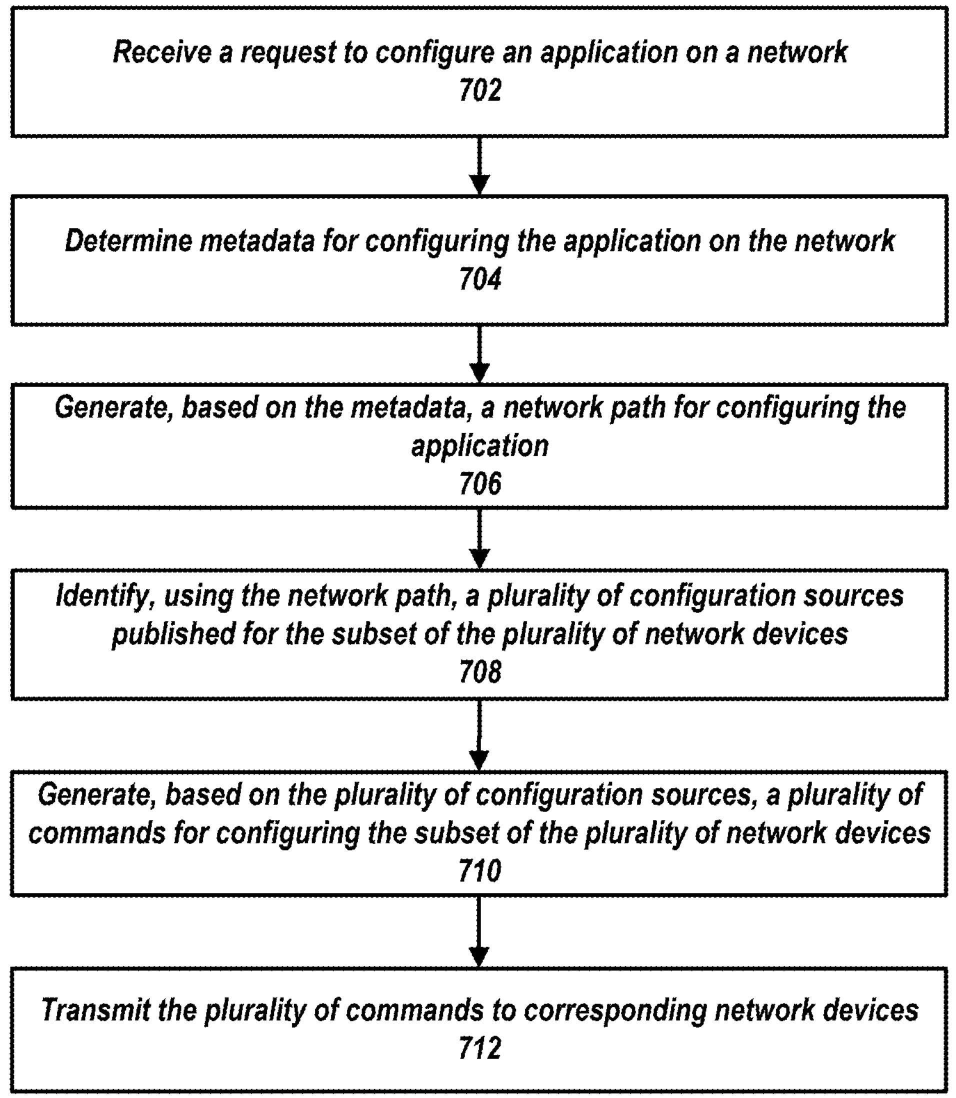
FIG. 7 shows a flowchart of operations for autonomous network configuration, in accordance with one or more embodiments.

FIG. 7 shows a flowchart of the operations for autonomous network configuration. For example, the system may use process 700 (e.g., as implemented on one or more system components described above (e.g., in FIGS. 1 and 6)) in order to perform autonomous network configuration. The operations described above may be performed on a user device (e.g., mobile device 622 or mobile device 624), in a cloud system, or using a combination of both. Thus, some operations may be performed on a user device, and some operations may be performed in the cloud. Mobile device 622 and/or mobile device 624 may be user devices associated with users (e.g., smartphones, electronic tablets, etc.).

At 702, network configuration system 102 receives a request to configure an application on a network. For example, network configuration system 102 may receive the request from mobile device 622, mobile device 624, or one of cloud components 610. When the request is received from a user device, the request may be processed locally. However, when the request is received from one of cloud components 610, the request may be processed in the cloud. In some embodiments, the request may be processed by the combination of cloud components 610 and a mobile device 622 or mobile device 624.

At 704, network configuration system 102 generates, based on the metadata, a network path for configuring the application. For example, network configuration system 102 may perform this operation from mobile device 622, mobile device 624, or one of cloud components 610. For example, network configuration system 102 may reside on a user device on a server in the cloud or in another suitable location. Network configuration system 102 may also perform the generation operation using one or more of cloud components 610. In another example, network configuration system 102 may reside on one of cloud components 610 and may perform the generation operation within the cloud.

At 706, network configuration system 102 generates, based on the metadata, a network path for configuring the application. For example, network configuration system 102 may perform the generation operation on mobile device 622, mobile device 624, or on one of cloud components 610. For example, network configuration system 102 may reside on a user device and may perform the generation operation on the user device. In some embodiments, network configuration system 102 may perform the generation operation on one of cloud components 610.

At 708, network configuration system 102 identifies, using the network path, a plurality of configuration sources published for the subset of the plurality of network devices. For example, network configuration system 102 may perform this operation on mobile device 622, mobile device 624, or on one of cloud components 610. At 710, network configuration system 102 generates, based on the plurality of configuration sources, a plurality of commands for configuring the subset of the plurality of network devices. For example, network configuration system 102 may perform this operation on mobile device 622, mobile device 624, or on one of cloud components 610. At 712, network configuration system 102 transmits the plurality of commands to corresponding network devices. For example, network configuration system 102 may perform this operation on mobile device 622, mobile device 624, or on one of cloud components 610.

Figure 8:
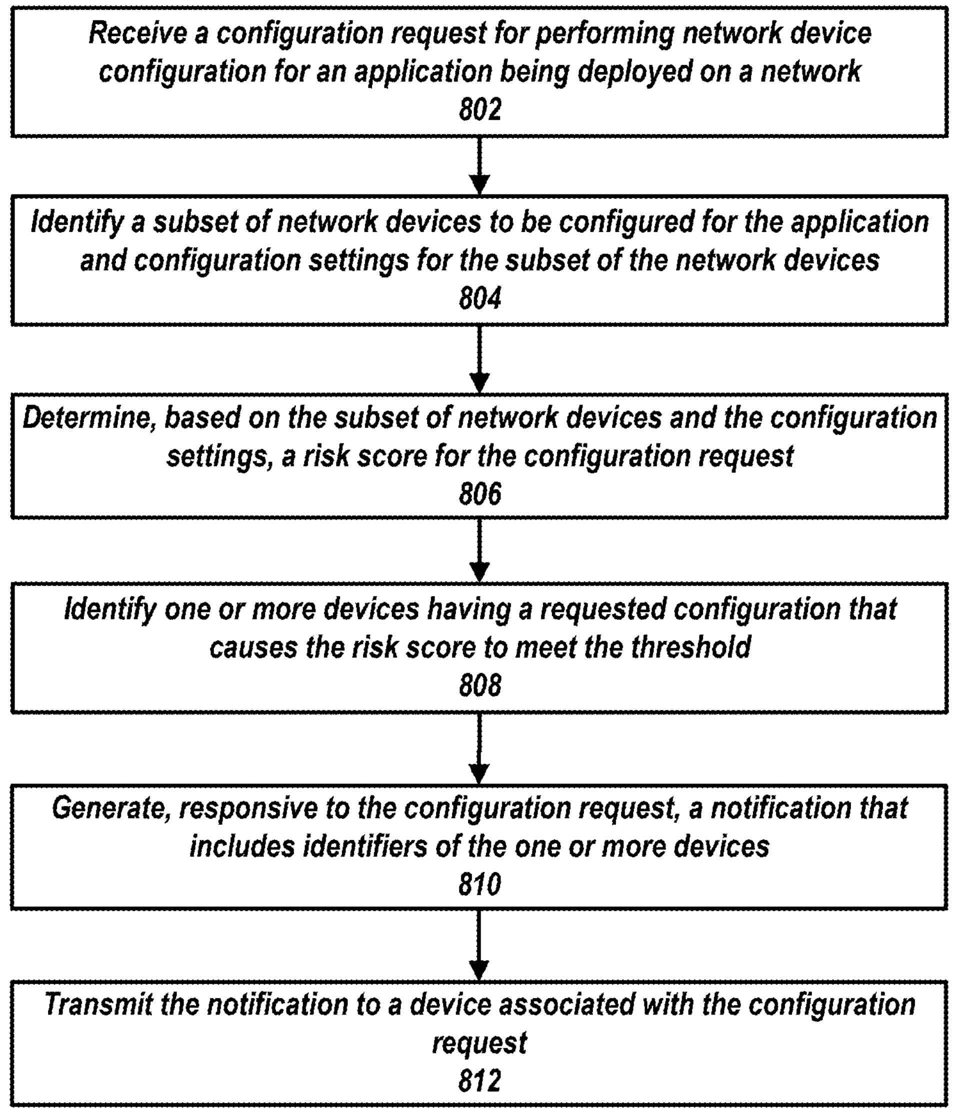
FIG. 8 shows a flowchart of operations for performing risk analysis, in accordance with one or more embodiments.

FIG. 8 shows a flowchart of operations for risk identification. For example, the system may use process 800 (e.g., as implemented on one or more system components described above (e.g., in FIGS. 1 and 6)) in order to perform autonomous risk calculations when network configuration is changed. The operations described above may be performed on a user device (e.g., mobile device 622 or mobile device 624), in a cloud system, or using a combination of both. Thus, some operations may be performed on a user device, and some operations may be performed in the cloud. Mobile device 622 and or mobile device 624 may be user devices associated with users such as developers (e.g., smartphones, electronic tablets, etc.).

At 802, network configuration system 102 receives a configuration request for performing network device configuration for an application being deployed on a network. For example, network configuration system 102 may receive the request from mobile device 622, mobile device 624, or one of cloud components 610. When the request is received from a user device, the request may be processed locally. However, when the request is received from one of cloud components 610, the request may be processed in the cloud. In some embodiments, the request may be processed by the combination of cloud components 610 and a mobile device 622 or mobile device 624.

At 804, network configuration system 102 identifies a subset of network devices to be configured for the application and configuration settings for the subset of the network devices. For example, network configuration system 102 may perform this operation from mobile device 622, mobile device 624, or one of cloud components 610. For example, network configuration system 102 may reside on a user device on a server in the cloud or in another suitable location. Thus, network configuration system 102 may perform this operation using one or more of cloud components 610.

At 806, network configuration system 102 determines, based on the subset of network devices and the configuration settings, a risk score for the configuration request. For example, network configuration system 102 may perform the generation operation on mobile device 622, mobile device 624, or on one of cloud components 610. At 808, network configuration system 102 identifies one or more devices having a requested configuration that causes the risk score to meet the threshold. For example, network configuration system 102 may perform this operation on mobile device 622, mobile device 624, or on one of cloud components 610. At 810, network configuration system 102 generates, responsive to the configuration request, a notification that includes identifiers of the one or more devices. For example, network configuration system 102 may perform this operation on mobile device 622, mobile device 624, or on one of cloud components 610. At 812, network configuration system 102 transmits the notification to a device associated with the configuration request. For example, network configuration system 102 may perform this operation on mobile device 622, mobile device 624, or on one of cloud components 610.

It is contemplated that the operations or descriptions of FIGS. 7 and 8 may be used with any other embodiment of this disclosure. In addition, the steps and descriptions described in relation to FIGS. 7 and 8 may be done in alternative orders or in parallel to further the purposes of this disclosure. For example, each of these operations may be performed in any order, in parallel, or simultaneously to reduce lag or increase the speed of the system or method. Furthermore, it should be noted that any of the components, devices, or equipment discussed in relation to the figures above could be used to perform one or more of the operations in FIGS. 7 and 8. Furthermore, the operations of FIGS. 7 and 8 may be moved between the processes disclosed within those FIGs.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, from a user, a request to configure an application on a network, wherein the request comprises an input file, and wherein the network comprises a plurality of network devices providing a plurality of network services; determining, from the input file, metadata for configuring the application on the network, wherein the metadata comprises permission settings and corresponding permission types; generating, based on the metadata, a network path for configuring the application, wherein the network path comprises a subset of the plurality of network devices and network connections connecting the subset of the plurality of network devices; identifying, using the network path, a plurality of configuration sources published for the subset of the plurality of network devices, wherein each configuration source of the plurality of configuration sources provides a mechanism for performing a corresponding command associated with application configuration; generating, based on the plurality of configuration sources, a plurality of commands for configuring the subset of the plurality of network devices; and transmitting the plurality of commands to corresponding network devices of the subset of the plurality of network devices.

2. The method of any one of the preceding embodiments, wherein identifying the plurality of configuration sources published for the subset of the plurality of network devices further comprises: determining, for a first network device of the subset of the plurality of network devices, a device type associated with the first network device; determining, based on the device type, one or more configuration sources published for the device type; and adding the one or more configuration sources to the plurality of configuration sources.

3. The method of any one of the preceding embodiments, wherein generating the plurality of commands for configuring the subset of the plurality of network devices further comprises: selecting a first network device of the plurality of network devices; determining, based on the metadata, a requested change for the first network device; accessing a configuration source of the plurality of configuration sources associated with a subset of network devices; and generating a command based on input data required by the configuration source, wherein the command updates a security access list for the first network device.

4. The method of any one of the preceding embodiments, further comprising: extracting, from each command of the plurality of commands, security data associated with each command; comparing each corresponding security data with stored security data, wherein the stored security data indicates an impermissible configuration; and determining, based on the security data matching the stored security data, that configuring one or more network devices of the subset of the plurality of network devices is impermissible.

5. The method of any one of the preceding embodiments, wherein determining the metadata for configuring the application on the network further comprises: determining that the input file comprises a natural language query; determining, using a natural language processing model, one or more network security contexts for configuring the application on the network; comparing the one or more network security contexts with a plurality of security metadata entries within a metadata repository; and generating the metadata based on one or more security metadata entries that match the one or more network security contexts.

6. The method of any one of the preceding embodiments, wherein generating the network path for configuring the application further comprises: determining, using the natural language processing model, one or more network device contexts for configuring the application on the network; comparing the one or more network device contexts with a plurality of device metadata entries within the metadata repository; and generating the network path based on one or more device metadata entries that match the one or more network device contexts.

7. The method of any one of the preceding embodiments, wherein generating the network path based on the one or more device metadata entries that match the one or more network device contexts comprises: comparing each network device context of the one or more network device contexts with network device data associated with the plurality of network devices within the network; identifying, based on comparing each network device context with a plurality of network device contexts, the subset of the plurality of network devices for the application; and determining the network path based on a connectivity matrix for the subset of the plurality of network devices.

8. A tangible, non-transitory, computer-readable medium storing instructions that, when executed by a data processing apparatus, cause the data processing apparatus to perform operations comprising those of any of embodiments 1-7.

9. A system comprising one or more processors; and memory storing instructions that, when executed by the processors, cause the processors to effectuate operations comprising those of any of embodiments 1-7.

10. A system comprising means for performing any of embodiments 1-7.

Further techniques will be better understood with reference to the following enumerated embodiments:

1. A method, the method comprising: receiving a configuration request for performing network device configuration for an application being deployed on a network, wherein the network comprises a plurality of network devices providing a plurality of network services; identifying, using metadata generated based on the configuration request (1) a subset of the plurality of network devices that are to be configured for the application and (2) a plurality of configuration settings for the subset of the plurality of network devices; determining, based on the subset of the plurality of network devices and the plurality of configuration settings, a risk score associated with the configuration request; based on determining that the risk score meets a threshold, identifying one or more devices having a requested configuration that causes the risk score to meet the threshold; generating, responsive to the configuration request, a notification comprising identifiers of the one or more devices, wherein the notification indicates that the configuration request has failed; and transmitting the notification to a device associated with the configuration request.

2. The method of any one of the preceding embodiments, wherein the instructions for determining the risk score associated with the configuration request cause the one or more processors to perform operations comprising: retrieving network device data associated with a first network device of the subset of the plurality of network devices; generating, based on the network device data for the first network device, a security parameter associated with the first network device; generating, based on a subset of the plurality of configuration settings for the first network device, a command parameter associated with the first network device; and determining the risk score based on the security parameter and the command parameter.

3. The method of any one of the preceding embodiments, wherein the instructions for determining the risk score associated with the configuration request cause the one or more processors to perform operations comprising: determining a device type associated with a first network device of the subset of the plurality of network devices; determining a command type associated with a first subset of the plurality of configuration settings for the first network device; and determining the risk score based on the device type and the command type.

4. The method of any one of the preceding embodiments, wherein the instructions further cause the one or more processors to perform operations comprising: determining command parameters associated with the first subset of the plurality of configuration settings; and determining the risk score based on the device type, the command type, and the command parameters.

5. The method of any one of the preceding embodiments, wherein the instructions further cause the one or more processors to perform operations comprising: determining, based on the device type, a device viability score for the first network device; determining, based on the command type, a command viability score for the first subset of the plurality of configuration settings; determining, based on the command parameters, a parameter viability score for the first subset of the plurality of configuration settings; and generating the risk score based on the device viability score, the command viability score, and the parameter viability score.

6. The method of any one of the preceding embodiments, wherein the instructions for determining the risk score associated with the configuration request cause the one or more processors to perform operations comprising: retrieving network device data associated with the subset of the plurality of network devices; retrieving the plurality of configuration settings from the subset of the plurality of network devices; and inputting the network device data and the plurality of configuration settings into a machine learning model to obtain the risk score, wherein the machine learning model has been trained to predict risk scores based on received network device data and received configuration settings.

7. The method of any one of the preceding embodiments, further comprising, determining, from the configuration request, the metadata for configuring the application on the network, wherein the metadata comprises permission settings and corresponding permission types.

8. A tangible, non-transitory, computer-readable medium storing instructions that, when executed by a data processing apparatus, cause the data processing apparatus to perform operations comprising those of any of embodiments 1-7.

9. A system comprising one or more processors; and memory storing instructions that, when executed by the processors, cause the processors to effectuate operations comprising those of any of embodiments 1-7.

10. A system comprising means for performing any of embodiments 1-7.

What is claimed is:

1. A system for assessing viability for new applications during network configuration, the system comprising:

one or more processors; and one or more memory devices configured to store instructions that when executed by the one or more processors perform operations comprising:

receiving a configuration request for performing network device configuration for an application being deployed on a network, wherein the network comprises a plurality of network devices providing a plurality of network services;

identifying, using metadata generated based on the configuration request, (1) a network path comprising a subset of the plurality of network devices that are to be configured for the application and (2) a plurality of configuration settings for the subset of the plurality of network devices;

generating a network path data structure for the network path, wherein the network path data structure includes (a) a list of device identifiers of each of the subset of the plurality of network devices and (b) a plurality of network addresses corresponding to the list of device identifiers;

retrieving network device data associated with the subset of the plurality of network devices, wherein the network device data comprises a device type and a network location associated with each device;

retrieving (i) a plurality of configuration sources published for the device type corresponding to a network address of a first device, wherein the plurality of configuration sources comprises application programming interfaces (APIs) and (ii) a plurality of command templates from the plurality of configuration sources;

iterating through subsequent devices in the network path data structure and retrieving a corresponding plurality of command templates from the plurality of configuration sources published for the device type corresponding to each subsequent device;

retrieving the plurality of configuration settings of the subset of the plurality of network devices, wherein the plurality of configuration settings for each network device of the subset comprise one or more parameters for a corresponding command template;

determining, for each network device of the subset of the plurality of network devices, (a) a corresponding device viability score based on the device type, (b) a corresponding command viability score based on a command type using a command identifier (c) and a corresponding plurality of parameter viability scores for each parameter of the corresponding command template, wherein the corresponding device viability score, the corresponding command viability score, and the corresponding plurality of parameter viability scores are components of a risk score;

inputting each corresponding device viability score, each corresponding command viability score, and each corresponding plurality of parameter viability scores associated with each device of the subset of the plurality of network devices, and the plurality of configuration settings for the subset of the plurality of network devices into a machine learning model to obtain a risk score, wherein the machine learning model has been trained to predict risk scores by combining each corresponding device viability score, each corresponding command viability score, and each corresponding plurality of parameter viability scores of each network device;

based on determining that the risk score meets a threshold, identifying one or more devices having a requested configuration that causes the risk score to meet the threshold;

generating, responsive to the configuration request, a notification comprising identifiers of the one or more devices, wherein the notification indicates that the configuration request has failed; and transmitting the notification to a device associated with the configuration request.

2. The system of claim 1, wherein the instructions for determining the risk score associated with the configuration request cause the one or more processors to perform operations comprising:

retrieving the network device data associated with a first network device of the subset of the plurality of network devices;

generating, based on the network device data associated with the first network device, a security parameter associated with the first network device;

generating, based on a subset of the plurality of configuration settings for the first network device, a command parameter associated with the first network device; and determining the risk score based on the security parameter and the command parameter.

3. The system of claim 1, wherein the instructions for determining the risk score associated with the configuration request cause the one or more processors to perform operations comprising:

determining the device type associated with a first network device of the subset of the plurality of network devices;

determining the command type associated with a first subset of the plurality of configuration settings for the first network device; and determining the risk score based on the device type and the command type.

4. The system of claim 3, wherein the instructions further cause the one or more processors to perform operations comprising:

determining command parameters associated with the first subset of the plurality of configuration settings; and determining the risk score based on the device type, the command type, and the command parameters.

5. The system of claim 1, further comprising, determining, from the configuration request, the metadata for configuring the application on the network, wherein the metadata comprises permission settings and corresponding permission types.

6. The system of claim 1, wherein the network path data structure further comprises, for the list of device identifiers, a plurality of virtual links, each virtual link pointing to a device identifier of a corresponding subsequent device.

7. A method for assessing viability for new applications during network configuration, the method comprising:

receiving a configuration request for performing network device configuration for an application being deployed on a network, wherein the network comprises a plurality of network devices providing a plurality of network services;

identifying, using metadata generated based on the configuration request, (1) a network path comprising a subset of the plurality of network devices that are to be configured for the application and (2) a plurality of configuration settings for the subset of the plurality of network devices;

generating a network path data structure for the network path, wherein the network path data structure includes (a) a list of device identifiers of each of the subset of the plurality of network devices and (b) a plurality of network addresses corresponding to the list of device identifiers;

retrieving network device data associated with the subset of the plurality of network devices, wherein the network device data comprises a device type and a network location associated with each device;

retrieving (i) a plurality of configuration sources published for the device type corresponding to a network address of a first device, wherein the plurality of configuration sources comprises application programming interfaces (APIs) and (ii) a plurality of command templates from the plurality of configuration sources;

iterating through subsequent devices in the network path data structure and retrieving the plurality of command templates from the plurality of configuration sources published for the device type corresponding to each subsequent device;

retrieving the plurality of configuration settings of the subset of the plurality of network devices, wherein the plurality of configuration settings for each network device of the subset comprise one or more parameters for a corresponding command template;

determining, for each network device of the subset of the plurality of network devices, (a) a corresponding device viability score based on the device type, (b) a corresponding command viability score based on a command type using a command identifier (c) and a corresponding plurality of parameter viability scores for each parameter of the corresponding command template, wherein the corresponding device viability score, the corresponding command viability score, and the corresponding plurality of parameter viability scores are components of a risk score;

inputting each corresponding device viability score, each corresponding command viability score, and each corresponding plurality of parameter viability scores associated with each device of the subset of the plurality of network devices, and the plurality of configuration settings for the subset of the plurality of network devices into a machine learning model to obtain the risk score, wherein the machine learning model has been trained to predict risk scores by combining each corresponding device viability score, each corresponding command viability score, and each corresponding plurality of parameter viability scores of each network device;

based on determining that the risk score meets a threshold, identifying one or more devices having a requested configuration that causes the risk score to meet the threshold;

generating, responsive to the configuration request, a notification comprising identifiers of the one or more devices, wherein the notification indicates that the configuration request has failed; and transmitting the notification to a device associated with the configuration request.

8. The method of claim 7, wherein determining the risk score associated with the configuration request further comprises:

retrieving the network device data associated with a first network device of the subset of the plurality of network devices;

generating, based on the network device data associated with the first network device, a security parameter associated with the first network device;

generating, based on a subset of the plurality of configuration settings for the first network device, a command parameter associated with the first network device; and determining the risk score based on the security parameter and the command parameter.

9. The method of claim 7, wherein determining the risk score associated with the configuration request further comprises:

determining the device type associated with a first network device of the subset of the plurality of network devices;

determining, the command type associated with a first subset of the plurality of configuration settings for the first network device; and determining the risk score based on the device type and the command type.

10. The method of claim 9, further comprising:

determining command parameters associated with the first subset of the plurality of configuration settings; and determining the risk score based on the device type, the command type, and the command parameters.

11. The method of claim 7, further comprising, determining, from the configuration request, the metadata for configuring the application on the network, wherein the metadata comprises permission settings and corresponding permission types.

12. The method of claim 7, wherein the network path data structure further comprises, for the list of device identifiers, a plurality of virtual links, each virtual link pointing to a device identifier of a corresponding subsequent device.

13. One or more non-transitory, computer-readable media storing instructions thereon that cause one or more processors to perform operations comprising:

receiving a configuration request for performing network device configuration for an application being deployed on a network, wherein the network comprises a plurality of network devices providing a plurality of network services;

identifying, using metadata generated based on the configuration request, (1) a network path comprising a subset of the plurality of network devices that are to be configured for the application and (2) a plurality of configuration settings for the subset of the plurality of network devices;

generating a network path data structure for the network path, wherein the network path data structure includes (a) a list of device identifiers of each of the subset of the plurality of network devices and (b) a plurality of network addresses corresponding to the list of device identifiers;

retrieving network device data associated with the subset of the plurality of network devices, wherein the network device data comprises a device type and a network location associated with each device;

retrieving (i) a plurality of configuration sources published for the device type corresponding to a network address of a first device, wherein the plurality of configuration sources comprises application programming interfaces (APIs) and (ii) a plurality of command templates from the plurality of configuration sources;

iterating through subsequent devices in the network path data structure and retrieving the plurality of command templates from the plurality of configuration sources published for the device type corresponding to each subsequent device;

retrieving the plurality of configuration settings of the subset of the plurality of network devices, wherein the plurality of configuration settings for each network device of the subset comprise one or more parameters for a corresponding command template;

determining, for each network device of the subset of the plurality of network devices, (a) a corresponding device viability score based on the device type, (b) a corresponding command viability score based on a command type using a command identifier (c) and a corresponding plurality of parameter viability scores for each parameter of the corresponding command template, wherein the corresponding device viability score, the corresponding command viability score, and the corresponding plurality of parameter viability scores are components of a risk score;

inputting each corresponding device viability score, each corresponding command viability score, and each corresponding plurality of parameter viability scores associated with each device of the subset of the plurality of network devices, and the plurality of configuration settings for the subset of the plurality of network devices into a machine learning model to obtain the risk score, wherein the machine learning model has been trained to predict risk scores by combining each corresponding device viability score, each corresponding command viability score, and each corresponding plurality of parameter viability scores of each network device;

based on determining that the risk score meets a threshold, identifying one or more devices having a requested configuration that causes the risk score to meet the threshold;

generating, responsive to the configuration request, a notification comprising identifiers of the one or more devices, wherein the notification indicates that the configuration request has failed; and transmitting the notification to a device associated with the configuration request.

14. The one or more non-transitory, computer-readable media of claim 13, wherein the instructions for determining the risk score associated with the configuration request further cause the one or more processors to perform operations comprising:

retrieving the network device data associated with a first network device of the subset of the plurality of network devices;

generating, based on the network device data associated with the first network device, a security parameter associated with the first network device;

generating, based on a subset of the plurality of configuration settings for the first network device, a command parameter associated with the first network device; and determining the risk score based on the security parameter and the command parameter.

15. The one or more non-transitory, computer-readable media of claim 13, wherein the instructions for determining the risk score associated with the configuration request further cause the one or more processors to perform operations comprising:

determining the device type associated with a first network device of the subset of the plurality of network devices;

determining, the command type associated with a first subset of the plurality of configuration settings for the first network device; and determining the risk score based on the device type and the command type.

16. The one or more non-transitory, computer-readable media of claim 15, wherein the instructions further cause the one or more processors to perform operations comprising:

determining command parameters associated with the first subset of the plurality of configuration settings; and determining the risk score based on the device type, the command type, and the command parameters.

17. The one or more non-transitory, computer-readable media of claim 13, wherein each virtual link further points to a device identifier of a corresponding preceding device in the network path.

18. The one or more non-transitory, computer-readable media of claim 13, wherein the network path data structure further comprises, for the list of device identifiers, a plurality of virtual links, each virtual link pointing to a device identifier of a corresponding subsequent device.

* * * * *